United States Patent
Jaradi et al.

(10) Patent No.: US 10,493,949 B2
(45) Date of Patent: Dec. 3, 2019

(54) SEATBELT ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 107 days.

(21) Appl. No.: 15/808,635

(22) Filed: Nov. 9, 2017

(65) Prior Publication Data
US 2019/0135227 A1    May 9, 2019

(51) Int. Cl.
*B60R 22/20*    (2006.01)
*B60R 22/24*    (2006.01)
*B60R 22/18*    (2006.01)
*B60R 21/00*    (2006.01)

(52) U.S. Cl.
CPC .......... *B60R 22/202* (2013.01); *B60R 22/205* (2013.01); *B60R 22/24* (2013.01); *B60R 2021/0009* (2013.01); *B60R 2022/1831* (2013.01); *B60R 2022/208* (2013.01)

(58) Field of Classification Search
CPC ... B60R 22/201; B60R 22/202; B60R 22/203; B60R 22/205; B60R 22/208; B60R 22/24; B60R 2022/1831; B60R 2022/1843; B60R 2021/0009; B60R 2021/0023; B60R 2022/208; B60N 2/427; B60N 2/42727; B60N 2/42736; B60N 2/42772; B60N 2/4279
See application file for complete search history.

(56) References Cited

U.S. PATENT DOCUMENTS

| | | | | |
|---|---|---|---|---|
| 4,466,666 A | * | 8/1984 | Takada | B60R 22/203 280/801.2 |
| 4,652,012 A | * | 3/1987 | Biller | B60R 22/203 280/801.2 |
| 4,834,427 A | * | 5/1989 | Takada | B60R 22/203 280/801.2 |
| 4,872,704 A | * | 10/1989 | Biller | B60R 22/201 280/801.2 |
| 4,907,821 A | * | 3/1990 | Fohl | B60R 22/203 280/801.2 |

(Continued)

FOREIGN PATENT DOCUMENTS

| | | | | |
|---|---|---|---|---|
| CN | 205498878 U | 8/2016 | | |
| DE | 3401529 A1 | * | 7/1985 | ........... B60R 22/203 |

(Continued)

*Primary Examiner* — Laura Freedman
(74) *Attorney, Agent, or Firm* — Frank A. MacKenzie; Bejin Bieneman PLC

(57) ABSTRACT

An assembly includes a base defining a track and a hole. The assembly includes a plate slidably engaged with the track. The assembly includes a pin supported by the plate and movable between a first position engaged with the hole and a second position disengaged with the hole. The assembly includes an actuator designed to move the pin from the first position to the second position. The assembly includes a webbing guide supported by the plate.

19 Claims, 8 Drawing Sheets

(56) References Cited

U.S. PATENT DOCUMENTS

| | | | | |
|---|---|---|---|---|
| 5,167,428 A * | 12/1992 | Garret | ............... | B60R 22/203 |
| | | | | 248/297.31 |
| 5,265,908 A * | 11/1993 | Verellen | ............ | B60R 22/205 |
| | | | | 280/801.2 |
| 5,437,475 A * | 8/1995 | Sugimoto | ......... | B60R 22/203 |
| | | | | 280/801.2 |
| 5,908,205 A * | 6/1999 | Griesemer | ........ | B60R 22/203 |
| | | | | 280/801.2 |
| 6,186,548 B1 * | 2/2001 | McFalls | ............ | B60R 22/203 |
| | | | | 280/801.2 |
| 10,144,387 B1 * | 12/2018 | Jaradi | ............. | B60R 22/1955 |
| 2008/0136141 A1 * | 6/2008 | Gray | ................ | B60R 22/202 |
| | | | | 280/727 |
| 2019/0111875 A1 * | 4/2019 | Jaradi | ............. | B60R 21/0136 |

FOREIGN PATENT DOCUMENTS

| | | | | |
|---|---|---|---|---|
| DE | 3627087 A1 * | 3/1988 | ......... | B60R 22/203 |
| EP | 0150065 A2 * | 7/1985 | ......... | B60R 22/203 |
| FR | 2664548 A1 * | 1/1992 | ......... | B60R 22/205 |
| JP | 02279445 A * | 11/1990 | | |
| JP | 2007253734 A | 10/2007 | | |
| JP | 2010208466 A * | 9/2010 | | |
| JP | 2010280337 A * | 12/2010 | | |
| JP | 4816118 B2 | 9/2011 | | |
| KR | 20000046029 A | 2/2001 | | |
| KR | 20050040340 A | 5/2005 | | |
| KR | 20060127492 A | 12/2006 | | |

\* cited by examiner

SEATBELT ASSEMBLY

BACKGROUND

The seatbelt portion of a vehicle restraint system secures the occupant of a vehicle against harmful movement that may result from a vehicle collision. The seatbelt functions to reduce the likelihood of injury by reducing the force of occupant impacts with vehicle interior structures. In this role, the seatbelt applies loads across the chest or lap of the occupant. Controlling or reducing these loads may reduce the risk of occupant injury during a collision.

DETAILED DESCRIPTION

Figure 1:
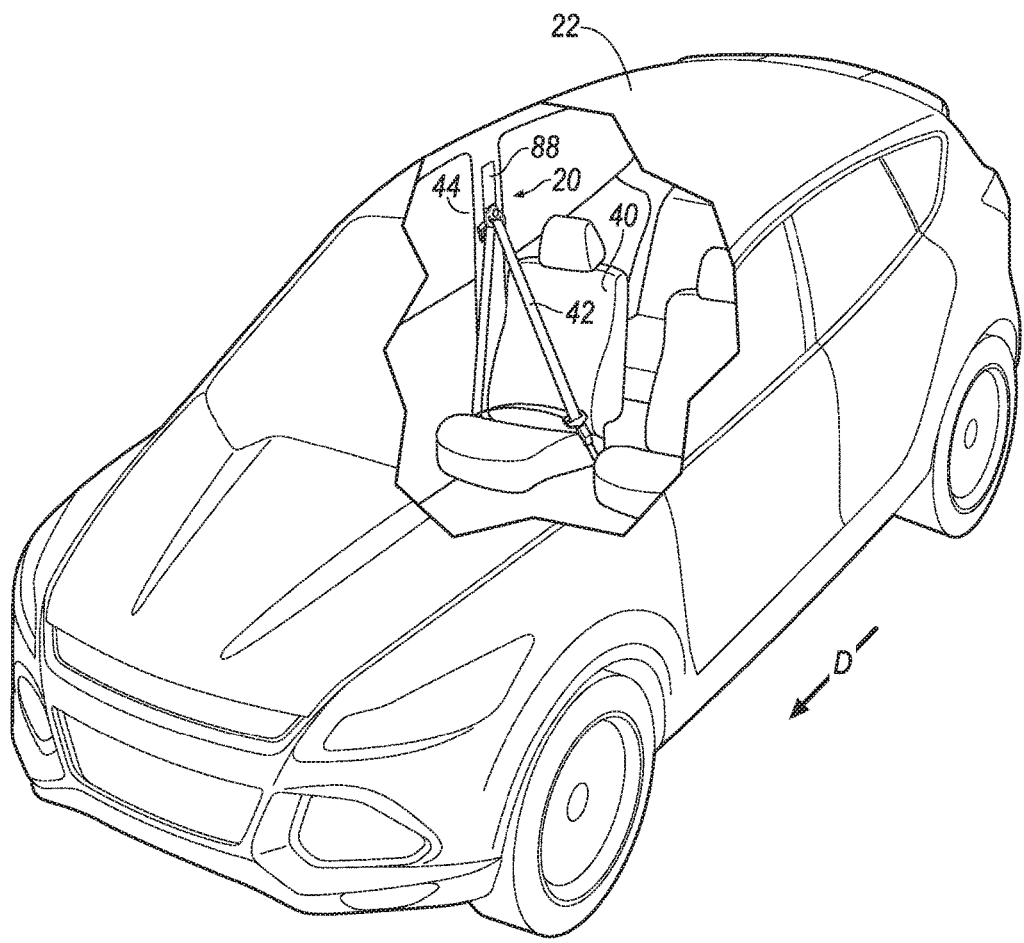
FIG. 1 is a perspective view of a vehicle including a seatbelt assembly.
Figure 2:
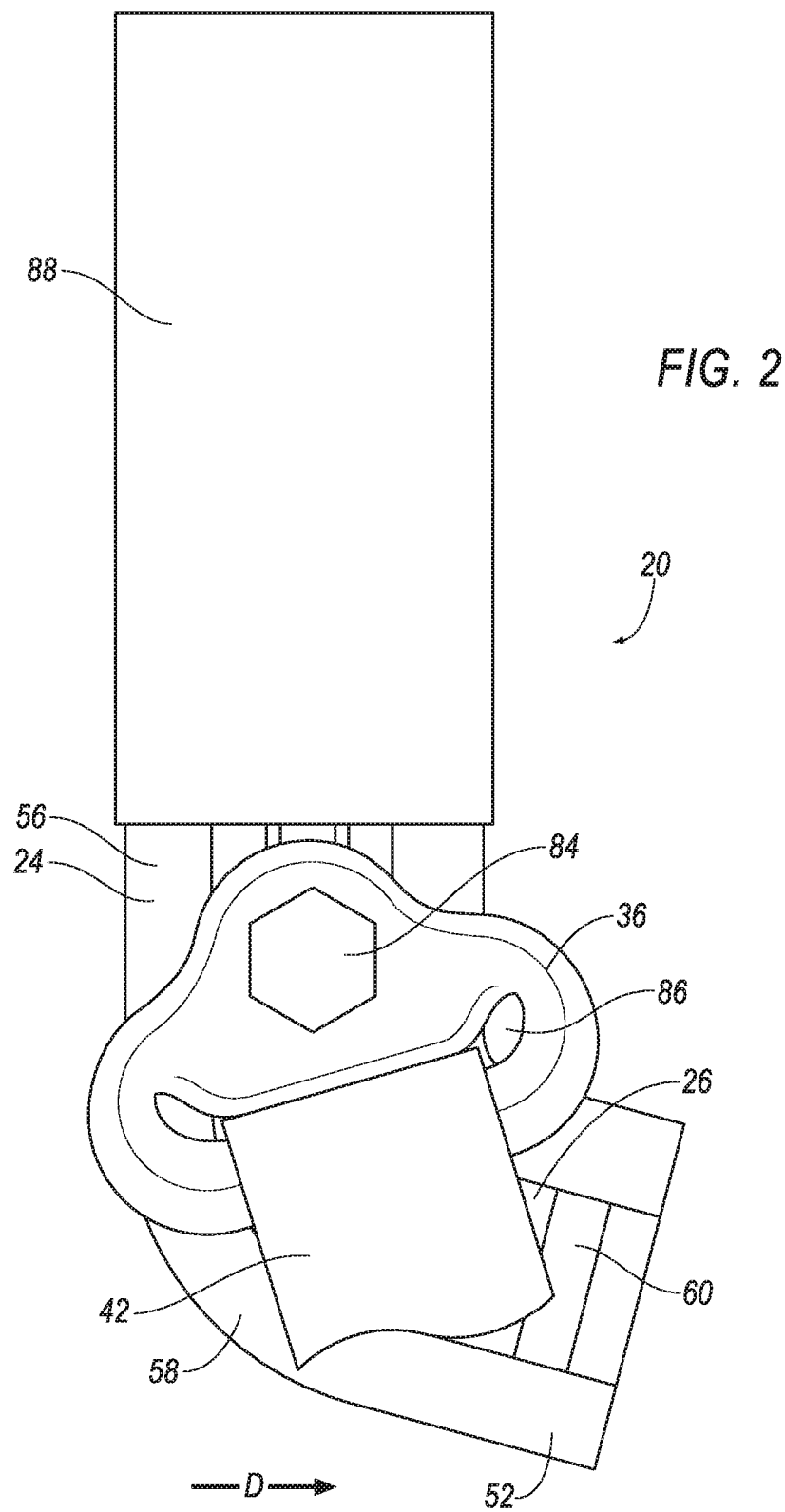
FIG. 2 is a side view of the seatbelt assembly of FIG. 1.

An assembly includes a base defining a track and a hole. The assembly includes a plate slidably engaged with the track. The assembly includes a pin supported by the plate and movable from a first position engaged with the hole to a second position disengaged with the hole. The assembly includes an actuator designed to move the pin from the first position to the second position. The assembly includes a webbing guide supported by the plate.

The plate may be circular.

The track may include a linear portion and a curved portion.

The base may define a plurality of holes spaced from each other along the linear portion.

The plate may define a hole, and the pin in the first position may extend through the hole in the plate.

The assembly may include a webbing, the webbing guide may include a slot, and the webbing may be disposed within the slot.

The assembly may include a lever arm having a first end and a second end opposite the first end, the first end may be secured to the pin, and the second end may be adjacent the actuator.

The assembly may include a spring disposed between the plate and the second end of the lever arm.

The assembly may include a reaction member fixed to the plate, the actuator may be disposed between the reaction member and the second end of the lever arm.

The reaction member may be flexible.

The reaction member may include a main portion and a pair of arms extending from the main portion, each of the arms may be fixed to the plate.

The actuator may be an electromagnetic solenoid.

The assembly may include a processor and a memory, the memory storing instructions executable by the processor to actuate the actuator to move the pin from the first position to the second position upon detecting a vehicle impact.

The track may be a channel.

The base and the plate may be metal.

The assembly may include a stopper, and the base may include a first end and a second end opposite the first end, the track may extend from the first end to the second end, the stopper may be fixed to the base at the second end.

The base may include a first end and a second end opposite the first end, the track may extend from the first end to the second end, and the base may define an opening designed to receive the plate at the first end.

The assembly may include a trim cover, the pin may be disposed between the base and the trim cover.

The assembly may include a processor and a memory, the memory storing instructions executable by the processor to actuate the actuator to move the pin from the first position to the second position only upon detecting an oblique vehicle impact.

The oblique vehicle impact may be 15-25 degrees offset from a vehicle forward direction.

With reference to the Figures, a seatbelt assembly 20 for a vehicle 22 includes a base 24 defining a track 26 and a hole 28. The seatbelt assembly 20 includes a plate 30 slidably engaged with the track 26. The seatbelt assembly 20 includes a pin 32 supported by the plate 30 and movable from a first position engaged with the hole 28 to a second position disengaged with the hole 28. The seatbelt assembly 20 includes an actuator 34 designed to move the pin 32 from the first position to the second position. The seatbelt assembly 20 includes a webbing guide 36 supported by the plate 30.

During a vehicle impact, e.g., an oblique impact to the vehicle 22, the seatbelt assembly 20 restrains an occupant of a seat 40 of the vehicle and/or limits a displacement of the occupant relative to the seat 40. Disengagement of the pin 32 from the hole 28 permits the plate 30 to slide along the track 26, e.g., allowing a webbing 42 of the seatbelt assembly 20 to move to an alternate position relative to the seat 40.

The vehicle 22 may be any passenger or commercial automobile such as a car, a truck, a sport utility vehicle, a crossover vehicle, a van, a minivan, a taxi, a bus, etc. The vehicle 22 may include the seatbelt assembly 20, one or more seats 40, one or more pillars 44, etc. The vehicle 22 defines a vehicle forward direction D, e.g., relative to a direction of travel of the vehicle 22 when wheels of vehicle 22 are all aligned in a same direction, relative to a seating position of an operator of the vehicle 22 interacting with control interfaces, e.g., a steering wheel, mounted on an instrument panel of the vehicle 22, etc.

The base 24 supports components of the seatbelt assembly 20, e.g., the plate 30, the webbing guide 36, etc. The base 24 may secure such components to other components of the vehicle 22. For example, the base 24 may be fixed to the pillar 44 of the vehicle 22, e.g., with one or more fasteners, etc. The base 24 may be metal, or any other suitable material.

The base 24 defines the track 26. As one example, as shown in the figures, the track 26 may be a channel 27. For example, the channel 27 may include a main portion 46 and a pair of extensions 48 spaced from each other. The extensions 48 may be spaced from each other and extend away from the base 24. The extensions 48 may extend toward each other to retain the plate 30 in the channel 27. In other words, the track 26 may have a lip channel shape. As other examples, the track 26 may include any other suitable structure, e.g., one or more rails, grooves, etc.

Figure 3:
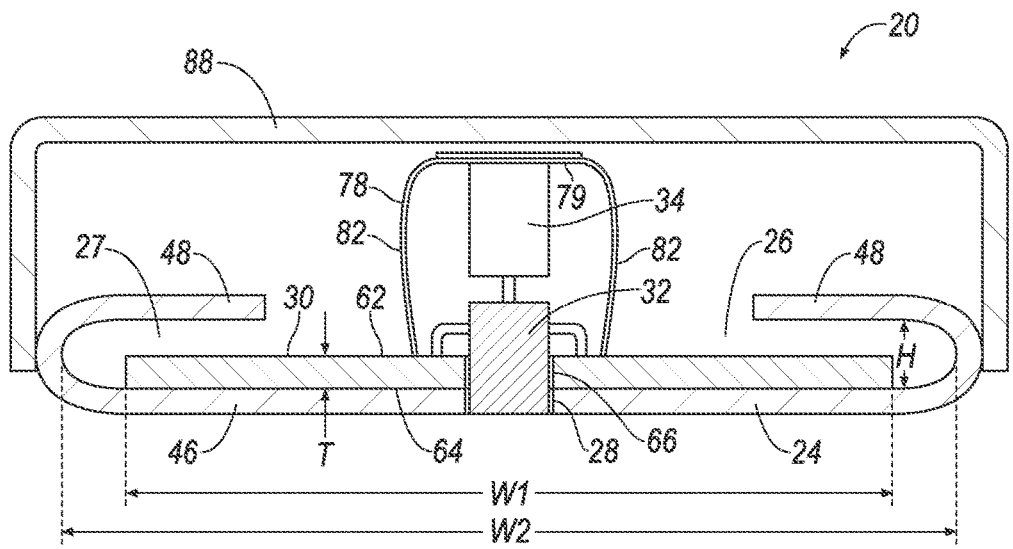
FIG. 3 is a cross section view of the seatbelt assembly with a pin in a first position engaged with the base.
Figure 4:
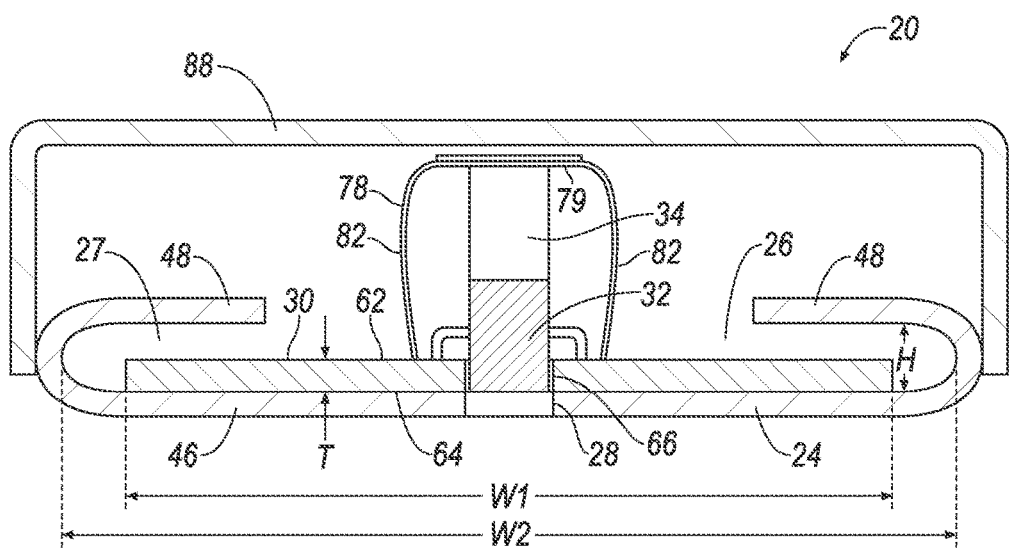
FIG. 4 is a cross section view of the seatbelt assembly with the pin in a second position disengaged with the base.
Figure 5:
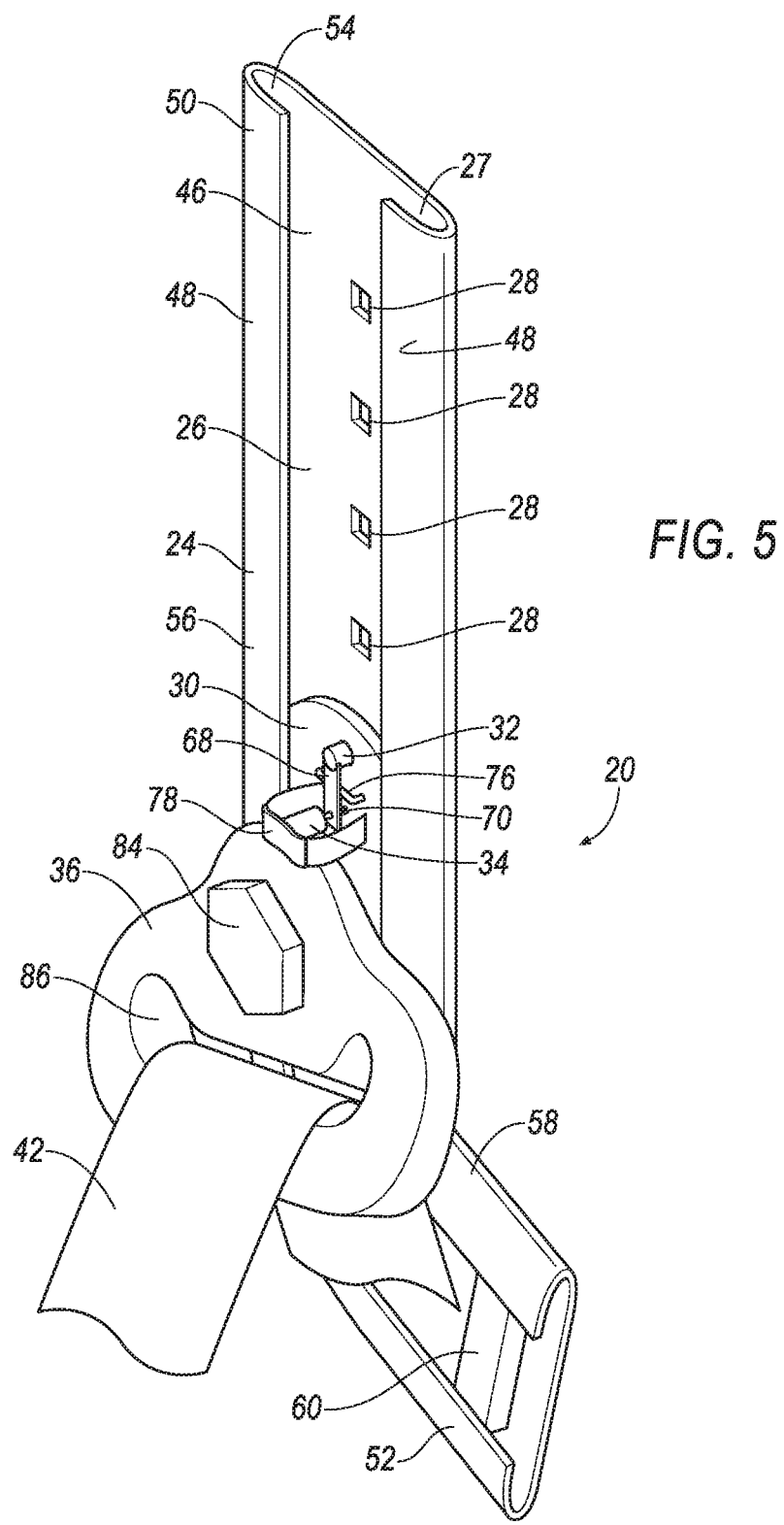
FIG. 5 is a perspective view of the seatbelt assembly.

The base 24 includes a first end 50 and a second end 52 opposite the first end 50. The first end 50 is spaced from the second end 52. The track 26 may extend from the first end 50 to the second end 52 of the base 24. The base 24 may define an opening 54 at the first end 50, as shown in FIG. 5. The opening 54 provides access to the track 26. The opening 54 may be designed to receive the plate 30, e.g., such that the plate 30 may be engaged with the track 26. For example, a width W1 of the opening 54 may be greater than a width W2 of the plate 30, and a height H of the opening 54 may be greater than a thickness T of the plate 30, as shown in FIGS. 3 and 4. The width W1 of the opening 54 may be between the extensions 48. The height may be between the main portion 47 and the extensions 48.

The track 26 may include a linear portion 56 and a curved portion 58. The linear portion 56 and the curved portion 58 may collectively provide a J-shape to the track 26, as shown in FIGS. 2, 5, 7, and 8. The linear portion 56 may be at the first end 50 of the base 24. The curved portion 58 may be at the second end 52 of the base 24.

The base 24 defines one or more holes 28. The holes 28 may be spaced from each other along the linear portion 56. The holes 28 may be sized to receive the pin 32, e.g., such that the pin 32 may be slip-fit therein. The holes 28 may be defined in the main portion 46 of the base 24.

The seatbelt assembly 20 may include a stopper 60. The stopper 60 limits travel of the plate 30 along the track 26. The stopper 60 may be fixed to the base 24 at the second end 52, e.g., via one or more fasteners, welding, adhesive, etc. The stopper 60 may be fixed to the main portion 46 of the base 24. The stopper 60 and the base 24 may be monolithic, i.e., a single piece of material with no seams, joints, fasteners, or adhesives holding the stopper 60 and base 24 together. The stopper 60 may be metal, or any other suitable material.

The plate 30 supports components of the seatbelt assembly 20, e.g., the pin 32, the actuator 34, the webbing guide 36, etc. The plate 30 may be circular in shape. The plate 30 has a first surface 62 and a second surface 64 opposite the first surface 62. As set forth above, the plate 30 has the width W2. The width W2 of the plate 30 may be a diameter of the circular shape. As also set forth above, the plate 30 has the thickness T. The thickness T of the plate 30 may be between the first surface 62 and the second surface 64. The plate 30 may be metal, or any other suitable material.

The plate 30 may define a hole 66. The hole 66 may extend from the first surface 62 to the second surface 64. The hole 66 may be offset from a center of the circular shape.

The plate 30 is slidably engaged with the track 26. For example, the thickness T and the width W2 of the plate 30 may be sized such the plate 30 is slip-fit within the lip channel shape of the base 24. The plate 30 may slide along the track 26 between the first end 50 of the base 24 and the second end 52 of the base 24.

The pin 32 is supported by the plate 30. For example, the pin 32 may be disposed within the hole 66 of the plate 30. The pin 32 may be cylindrical, or any other suitable shape. The pin 32 may be metal, or any other suitable material.

The pin 32 engages and disengages with the hole 28 of base 24 to inhibit and permit, respectively, movement of the plate 30 relative to the base 24. The pin 32 is movable between the first position and the second position. The pin 32 in the first position is engaged with the hole 28 of the base 24 to inhibit movement of the plate 30 relative to the base 24. For example, the pin 32 in the first position may be disposed within the hole 28 of the base 24. The pin 32 in the first position may extend through the hole 66 in the plate 30, e.g. from the first surface 62 of the plate 30 to the second surface 64 of the plate 30. The pin 32 in the second position is disengaged with the hole 28 of the base 24 to permit movement of the plate 30 relative to the base 24. For example, the pin 32 in the second position may be disposed completely outside of the hole 28 of the base 24. The pin 32 in the second position may extend through the hole 66 in the plate 30, e.g. from the first surface 62 of the plate 30 to the second surface 64 of the plate 30.

The seatbelt assembly 20 may include a lever arm 68. The lever arm 68 transfers mechanical force, e.g., from the actuator 34, a spring 70, the occupant of the vehicle 22, etc., to the pin 32, e.g., to move the pin 32 from the first position to the second position, and vice versa. The lever arm 68 may have a first end 72 and a second end 74 opposite the first end 72. The first end 72 of the lever arm 68 may be secured to the pin 32, e.g., the pin 32 and lever arm 68 may be monolithic, fixed via fasteners, adhesives, etc. The second end 74 of the lever arm 68 may be adjacent the actuator 34 to permit the actuator 34 to apply force to the second end 74 of the lever arm 68. For example, the second end 74 of the lever arm 68 may abut the actuator 34. The lever arm 68 may be pivotally supported by plate 30, e.g., via a fulcrum 76. The fulcrum 76 may be disposed between the first end 72 and the second end 74 of the lever arm 68. The fulcrum 76 and the plate 30 may be monolithic, fixed via fasteners, adhesives, etc.

The seatbelt assembly 20 may include the spring 70. The spring 70 is designed to urge pin 32 to the first position. For example, the spring 70 may be disposed between the plate 30 and the second end 74 of the lever arm 68. The spring 70 may urge the second end 74 of the lever arm 68 away from the plate 30 to urge the first end 72 of the lever arm 68 toward the plate 30. The spring 70 may be a coil spring, a compression spring, or any other suitable structure that is elastically deformable.

Figure 6:
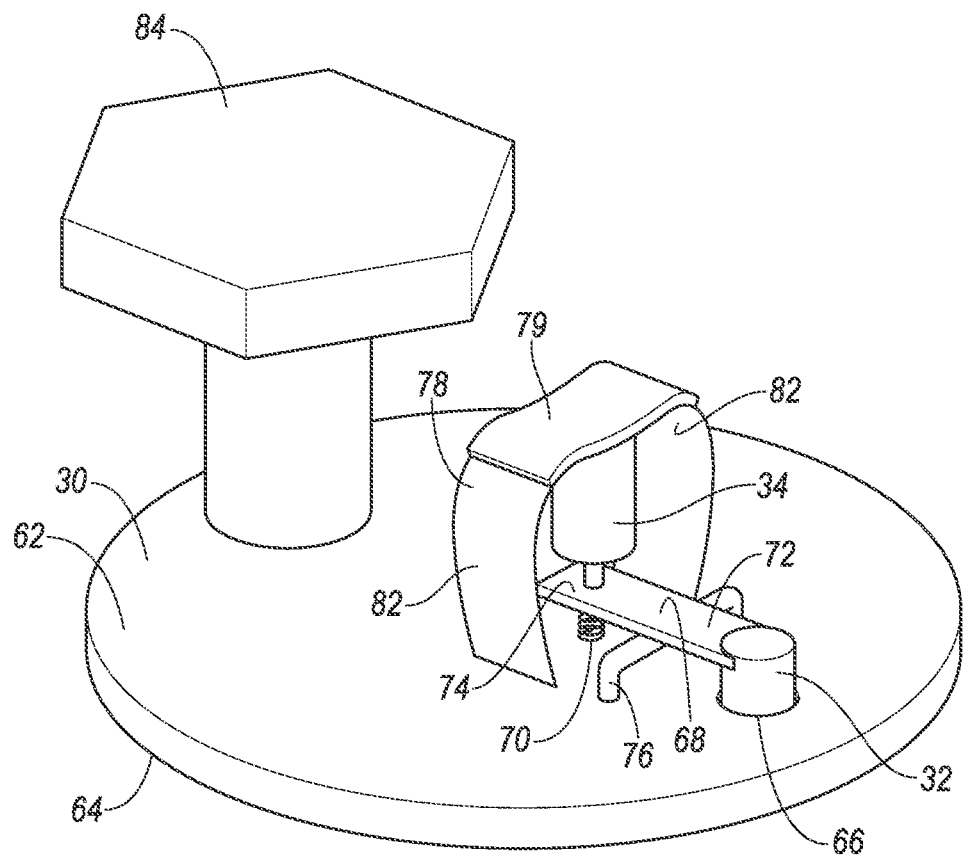
FIG. 6 is a perspective view of a plate of the seatbelt assembly.
Figure 7:
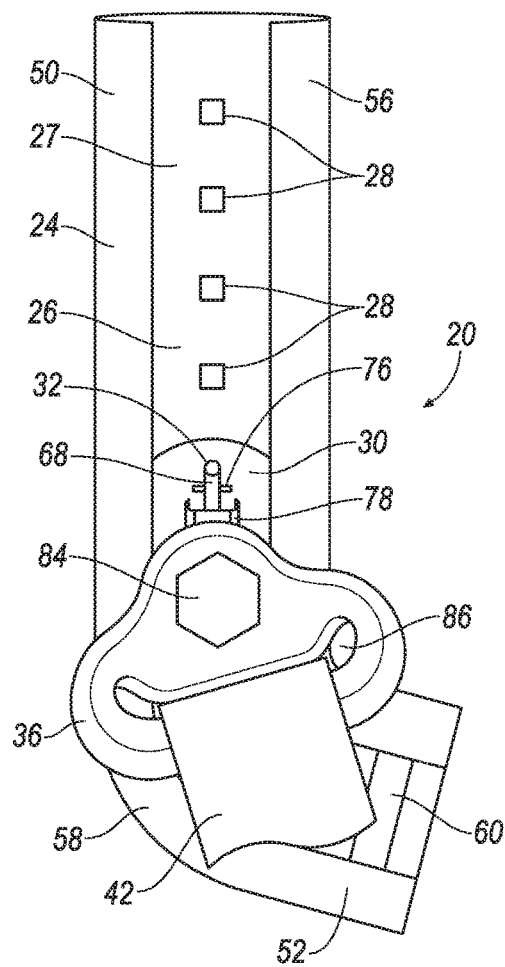
FIG. 7 is a side view of the seatbelt assembly without a trim cover.
Figure 8:
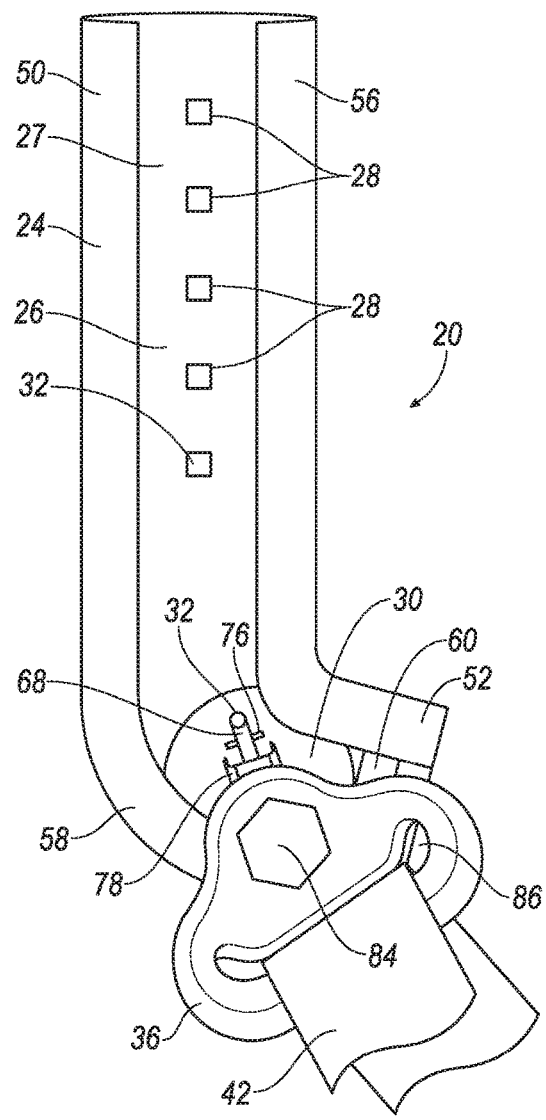
FIG. 8 is a side view of the seatbelt assembly without a trim cover and with the plate at a second end of a track.

With reference to FIGS. 3, 4, and 6, the seatbelt assembly 20 may include a reaction member 78. The reaction member 78 provides a reaction surface, e.g., for the actuator 34. The reaction member 78 may include a main portion 79. The reaction member 78 may include a pair of arms 82 extending from the main portion 79. The reaction member 78 may be fixed to the plate 30, for example each of the arms 82 may be fixed to the plate 30, e.g., via fasteners, adhesive, etc. The reaction member 78 may be flexible. For example, the arms 82 may be flexible, e.g., permitting the arms 82 to flex and decrease a distance between opposing ends of the each of the arms 82. The second end 74 of the lever arm 68 may be disposed between the reaction member 78 and the plate 30. The spring 70 may be disposed between the reaction member 78 and the plate 30. The reaction member 78 may be plastic, or any other suitable material. As set forth below, an occupant may manually disengage the pin 32 from the hole 28 in which the pin 32 is engaged by pressing on the reaction member 78, which compresses the spring 70 and pivots the lever arm 68 to disengage the pin 32 from the hole 28.

The actuator 34 is designed to move the pin 32 from the first position to the second position. For example, the actuator 34 may be disposed between the reaction member 78 and the second end 74 of the lever arm 68, e.g., such that actuation of the actuator 34, e.g., in response to a command from a computer 80, causes the actuator 34 to lengthen and urge the second end 74 of the lever arm 68 toward the plate 30, pivoting the lever arm 68 about the fulcrum 76 and urging the first end 72 of the lever arm 68 away from the plate 30. The actuator 34 may be located in other locations, e.g., between the plate 30 and the first end 72 of the lever arm 68, etc., provided that such locations permit actuation of the actuator 34 to move the pin 32 from the first position to the second position. The actuator 34 may be an electromagnetic solenoid, a linear servo, or any other suitable device.

The webbing guide 36 supports the webbing 42 and redirects tension applied thereto. The webbing guide 36 is supported by the plate 30. For example, the webbing guide 36 may be fixed to the plate 30 with a bolt 84, or may be secured by any other suitable structure.

The webbing guide 36 includes a slot 86. The slot 86 may be elongated and have a length that is greater than a width of the webbing 42. The webbing guide 36 may include one or more holes, e.g., to receive the bolt 84 fixing the webbing guide 36 to the plate 30. The webbing guide 36 may be metal, or any other suitable material. The webbing guide 36 may include a shell, e.g., reducing friction between the webbing guide 36 and the webbing 42, providing a class-A surface, i.e., a surface specifically manufactured to have a high-quality, finished aesthetic appearance free of blemishes, to the webbing guide 36, etc. The shell may be plastic or any other suitable material.

The seatbelt assembly 20 may include a trim cover 88. The trim cover 88 protects components of the seatbelt assembly 20, e.g., the pin 32, the plate 30, the lever arm 68, etc., and provides a class-A surface to the seatbelt assembly 20. The trim cover 88 may be slidably supported by the base 24, the pillar 44, etc. The pin 32 may be disposed between the base 24 and the trim cover 88. The plate 30 may be disposed between the base 24 and the trim cover 88. The lever arm 68 may be disposed between the base 24 and the trim cover 88. The trim cover 88 may be plastic, or any other suitable material.

The seatbelt assembly 20 may include a retractor. The retractor may be attached to a component of the vehicle 22, e.g., to one of the pillars 44, to one of the seats 40, etc. The retractor may be attached in any suitable manner, e.g., with one or more fasteners, etc. The retractor may include a spool. The spool may freely rotate within the retractor. The spool may be adapted to receive the webbing 42, for example, by including a webbing attachment slot and permitting the webbing 42 to wind around the spool. The retractor may include a locking mechanism that inhibits rotation of the spool when the vehicle 22 is subject to deceleration above a threshold amount, e.g., during the impact of the vehicle 22.

The webbing 42 may be formed of fabric in the shape of a strap. The webbing 42 may be attached to the spool, with the webbing 42 wound around the spool. The webbing 42 may be payable from the retractor, e.g., when the spool is not prevented from rotating by the locking mechanism. The webbing 42 may be disposed within the slot 86 of the webbing guide 36. For example, the webbing 42 may be slideably received in the slot 86.

Figure 9:
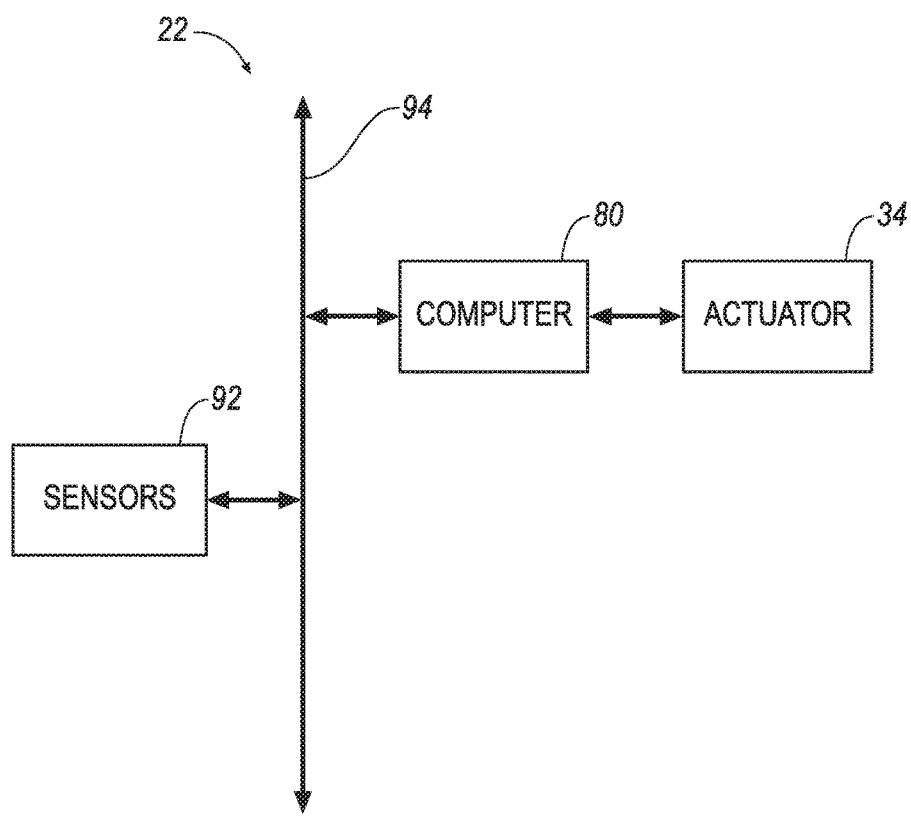
FIG. 9 is a block diagram of a system of the vehicle.

With reference to FIG. 9, the vehicle 22 may include a system including the seatbelt assembly 20. The system includes at least one impact sensor 92 for sensing impact of the vehicle 22. The impact sensor 92 is configured to detect an impact to the vehicle 22. The impact sensor 92 may be of any suitable type, for example, post-contact sensors such as accelerometers, pressure sensors, and contact switches; and pre-impact sensors 92 such as radar, LIDAR, and vision-sensing systems. The vision systems may include one or more cameras, CCD image sensors, CMOS image sensors, etc. The impact sensor 92 may be located at numerous points in or on the vehicle 22. Alternatively or additionally to sensing impact, the impact sensor 92 may be configured to sense impact prior to impact, i.e., pre-impact sensing.

The computer 80 may be a microprocessor-based computer 80 implemented via circuits, chips, or other electronic components. For example, the computer 80 may include a processor, a memory, etc. The memory of the computer 80 may include memory for storing programming instructions executable by the processor as well as for electronically storing data and/or databases.

The computer 80 and the impact sensor 92 may be connected to a communication bus 94, such as a controller area network (CAN) bus, of the vehicle 22. The computer 80 may use information from the communication bus 94, e.g., from the impact sensors 92, to control the actuation of the actuator 34. The actuator 34 may be connected directly to the computer 80, as shown in FIG. 9, or the actuator 34 may be connected via the communication bus 94.

The computer 80 may be programmed to move the pin 32 from the first position to the second position upon detecting a vehicle impact. For example, the computer 80 may identify the vehicle impact based on information received from the one or more impact sensors 92, e.g., via the communication bus 94. Upon identifying the vehicle 22 impact the computer 80 may transmit a command to the actuator 34, e.g., via the communication bus 94, instructing the actuator 34 to move the pin 32 from the first position to the second position, e.g., instruction the actuator 34 to lengthen.

Figure 10:
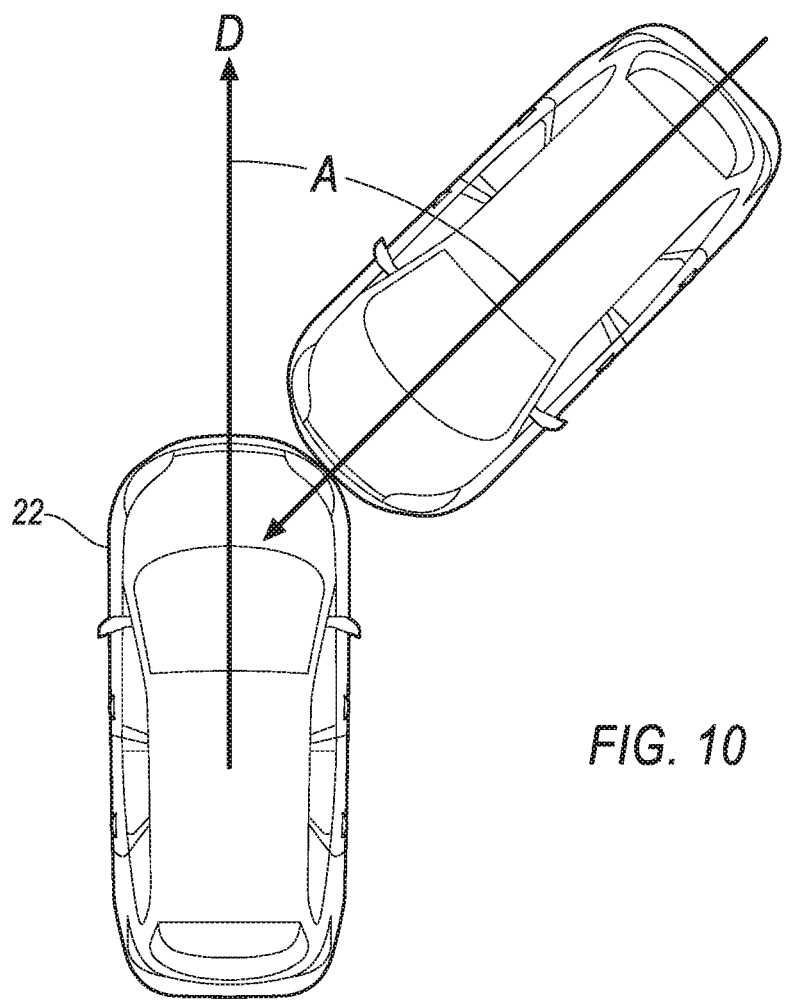
FIG. 10 is a top view of the vehicle experiencing an oblique impact with another vehicle.

The computer 80 may be programmed to actuate the actuator 34 to move the pin 32 from the first position to the second position only upon detecting an oblique vehicle impact. The oblique vehicle impact may be 15-25 degrees offset from the vehicle forward direction D. For example, the computer 80 may identify the vehicle impact and an angle A, shown in FIG. 10, of such impact e.g., relative to the vehicle forward direction D, based on information received from the one or more impact sensors 92, e.g., via the communication bus 94. Upon identifying the vehicle impact, and upon identifying that the angle A of such impact is 15-25 degrees offset from the vehicle forward direction D, the computer 80 may transmit a command to the actuator 34 instructing the actuator 34 to move the pin 32 from the first position to the second position. Otherwise, the computer 80 may refrain from transmitting such command.

In operation, the pin 32 may be manually disengaged and engaged with different ones of the holes 28 to adjust the position of the webbing guide 36 relative to the track 26, and may be automatically disengaged with the hole 28 upon detection of a vehicle impact, e.g., an oblique impact. Specifically, the pin 32 may be initially in the first position and engaged with one of the holes 28 of the plate 30, and subsequently disengaged from that hole 28 to adjust a height of the plate 30, e.g., relative to the occupant secured by the seatbelt assembly 20. For example, the occupant may apply a force to the main portion 79 of the reaction member 78, urging the main portion 79 toward the plate 30. Such force may be transferred to the second end 72 of the lever arm 68, e.g., via the actuator 34, to pivot the lever arm 68 to disengage the pin 32 from the hole 28 and allow the plate 30 to slide along the track 26, e.g., at the operator's discretion. When the occupant releases the force on the main portion 79, the pin 32 is released back toward the plate, e.g., by the force of the spring 70, to be engaged with the nearest hole 28.

During a vehicle impact, e.g., an oblique impact, the pin 32 may be disengaged from the hole 28 to permit the plate 30 to move during the vehicle impact. For example, the vehicle 22 computer 80 may actuate the actuator 34 upon identifying the vehicle 22 impact, as described herein. Such actuation may apply force to the second end 52 of the lever arm 68 to pivot the lever arm 68 and disengaging the pin 32 from the hole 28, allowing the plate 30 to slide along the track 26 until the plate 30 abuts the stopper 60.

Computing devices, such as computer 80, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions to perform one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a base defining a track and a hole;
a plate slidably engaged with the track;
a pin supported by the plate and movable from a first position engaged with the hole to a second position disengaged with the hole;
an electromagnetic solenoid actuator designed to move the pin from the first position to the second position; and
a webbing guide supported by the plate.

2. The assembly of claim 1, wherein the plate is circular.

3. The assembly of claim 1, wherein the track includes a linear portion and a curved portion.

4. The assembly of claim 3, wherein the base defines a plurality of holes spaced from each other along the linear portion.

5. The assembly of claim 1, wherein the plate defines a hole, and the pin in the first position extends through the hole in the plate.

6. The assembly of claim 1, further comprising a webbing, wherein the webbing guide includes a slot, and the webbing is disposed within the slot.

7. The assembly of claim 1, further comprising a lever arm having a first end and a second end opposite the first end, the first end secured to the pin, and the second end adjacent the actuator.

8. The assembly of claim 7, further comprising a spring disposed between the plate and the second end of the lever arm.

9. The assembly of claim 1, wherein the track includes a channel.

10. The assembly of claim 1, wherein the base and the plate are metal.

11. The assembly of claim 1, further comprising a stopper, and wherein the base includes a first end and a second end opposite the first end, the track extending from the first end to the second end, the stopper fixed to the base at the second end.

12. The assembly of claim 1, wherein the base includes a first end and a second end opposite the first end, the track extending from the first end to the second end, and the base defines an opening designed to receive the plate at the first end.

13. The assembly of claim 1, further comprising a trim cover, the pin disposed between the base and the trim cover.

14. An assembly comprising:
a base defining a track and a hole;
a plate slidably engaged with the track;
a pin supported by the plate and movable from a first position engaged with the hole to a second position disengaged with the hole;
an actuator designed to move the pin from the first position to the second position;
a webbing guide supported by the plate; and
a processor and a memory, the memory storing instructions executable by the processor to actuate the actuator to move the pin from the first position to the second position upon detecting a vehicle impact.

15. The assembly of claim 14, wherein the instructions include instructions to actuate the actuator to move the pin from the first position to the second position only upon detecting an oblique vehicle impact.

16. The assembly of claim 15, wherein the oblique vehicle impact is 15-25 degrees offset from a vehicle forward direction.

17. An assembly comprising:
a base defining a track and a hole;
a plate slidably engaged with the track;
a pin supported by the plate and movable from a first position engaged with the hole to a second position disengaged with the hole;
an actuator designed to move the pin from the first position to the second position;

a webbing guide supported by the plate;

a lever arm having a first end and a second end opposite the first end, the first end secured to the pin, and the second end adjacent the actuator; and a reaction member fixed to the plate, the actuator disposed between the reaction member and the second end of the lever arm.

18. The assembly of claim 17, wherein the reaction member is flexible.

19. The assembly of claim 17, wherein the reaction member includes a main portion and a pair of arms extending from the main portion, each of the arms fixed to the plate.

\* \* \* \* \*